(12) United States Patent
Krapf et al.

(10) Patent No.: US 8,436,741 B2
(45) Date of Patent: May 7, 2013

(54) LOCATING DEVICE

(75) Inventors: Reiner Krapf, Reutlingen (DE);
Michael Mahler, Leinfelden-Echterdingen (DE);
Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 648 days.

(21) Appl. No.: 12/303,228

(22) PCT Filed: Apr. 2, 2007

(86) PCT No.: PCT/EP2007/053166
§ 371 (c)(1),
(2), (4) Date: May 5, 2010

(87) PCT Pub. No.: WO2007/141062
PCT Pub. Date: Dec. 13, 2007

(65) Prior Publication Data
US 2010/0219965 A1     Sep. 2, 2010

(30) Foreign Application Priority Data
Jun. 2, 2006   (DE) .................. 10 2006 025 861

(51) Int. Cl.
*G08B 21/00* (2006.01)
*G08B 3/00* (2006.01)
*G01R 19/00* (2006.01)

(52) U.S. Cl.
USPC .................. 340/686.1; 340/555; 340/691.1; 340/691.6; 340/815.4; 324/66; 324/67; 342/459

(58) Field of Classification Search ............... 340/686.1; 324/67; 342/459
See application file for complete search history.

(56) References Cited

U.S. PATENT DOCUMENTS

| 6,886,269 | B2 * | 5/2005 | Hoffmann et al. | 33/773 |
| 7,414,235 | B2 * | 8/2008 | Hoffmann et al. | 250/221 |
| 7,532,127 | B2 * | 5/2009 | Holman et al. | 340/686.1 |
| 8,111,169 | B2 * | 2/2012 | Krapf et al. | 340/686.6 |
| 2005/0280425 | A1 | 12/2005 | Murray | |

FOREIGN PATENT DOCUMENTS

| EP | 1 341 005 | 9/2003 |
| WO | WO 99/27391 | 6/1999 |
| WO | WO 00/79305 | 12/2000 |
| WO | WO 2005/088348 | 9/2005 |

* cited by examiner

*Primary Examiner* — Donnie Crosland
(74) *Attorney, Agent, or Firm* — Merchant & Gould P.C.

(57) ABSTRACT

The invention is based on a locating device for locating objects in an item being investigated, said device having a basic body, a sensor unit for detecting a movement parameter when the basic body is moved relative to the item being investigated, an output unit and a control unit which, in conjunction with the output unit, is provided for the purpose of outputting an item of information on the basis of the movement parameter. It is proposed that the output unit has a light signal unit which is provided for the purpose of outputting the information using a light signal.

20 Claims, 5 Drawing Sheets

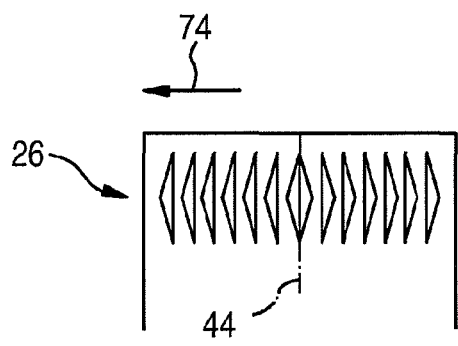
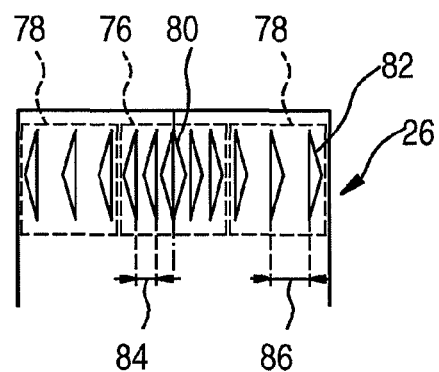
Fig. 4a          Fig. 4b
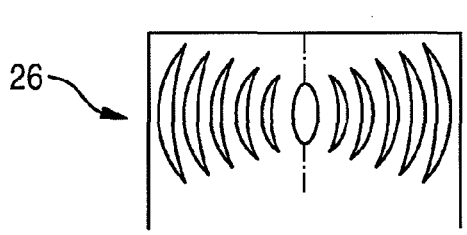
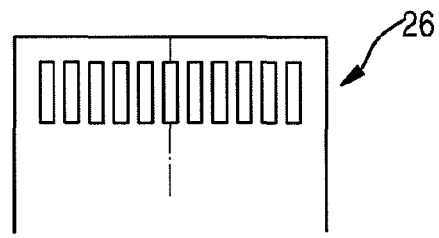
Fig. 4c          Fig. 4d
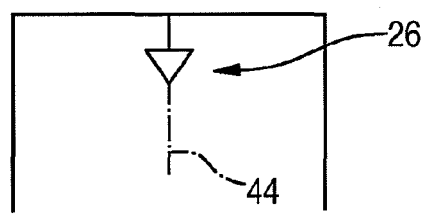
Fig. 4e

LOCATING DEVICE

TECHNICAL FIELD

The invention is based on a locating device for locating objects in an item being investigated according to the preamble of claim 1.

BACKGROUND

A locating device is known, which indicates during operation the presence and the position of objects in building materials to the operator. Such objects include, for example, pipes, cables and reinforcements in walls, ceilings or floors. Furthermore, the locating device has rolling bodies, whereby it can be moved along a surface of the item being investigated for the purpose of scanning said item.

SUMMARY

The invention is based on a locating device for locating objects in an item being investigated, said device having a basic body, a sensor unit for detecting a movement parameter when the basic body is moved relative to the item being investigated, an output unit and a control unit which, in conjunction with the output unit, is provided for the purpose of outputting an item of information on the basis of the movement parameter.

It is proposed, that the output unit has a light signal unit, which is provided for the purpose of outputting the information by means of a light signal. In so doing, a fast outputting of the information in a form intuitive to the operator can be achieved. A reliable outputting of the information can be particularly advantageously achieved by means of an increased visibility of the output unit when light conditions are unfavorable or positions of the electric device occur, whereat a reading of the output unit is impeded.

By a "movement parameter", a parameter should particularly be understood, with which a characteristic of the movement of the basic body relative to the item being investigated, such as especially a length of path or a direction of movement, can be ascertained. Different methods can be employed at the sensor unit for detecting the movement parameter. Said parameter can, for example, be opto-mechanically detected, as, for example, with the aid of the principle of a light barrier. Furthermore, an optical method can be employed, whereby a surface structure of the item being investigated is analyzed to detect a direction of movement and/or a distance covered during the movement of the basic body, as, for example, by means of a CCD sensor (Charge-Coupled Device). In so doing, the surface can be illuminated, and a laser beam can be used for a precise analysis of the surface. The use of an electronic method for detecting the movement parameter, as, for example, with the aid of a radar signal, is likewise conceivable. If the locating device for locating objects is configured by means of a radar method, a radar unit employed for locating objects can additionally be used to detect the movement parameter.

By a "light signal", a signal should particularly be understood, with which an item of information can be transmitted to an operator by means of a characteristic of a transmitted light, such as especially a light intensity, a color, a blinker frequency, a variable position of an emission point etc. In this connection, the light signal unit can have a light element for producing light, which, for example, is implemented as an LED (light emitting diode), and in fact as a semiconductor LED or an organic LED, as a glow lamp etc. Furthermore, the use of additional means for the production of luminous effects is conceivable. For example, the light element can be manufactured from a photoluminescent, notably fluorescent and/or phosphorescent, material, which radiates light during, respectively after, an excitation by irradiation with visible or ultraviolet light. The light element can additionally be manufactured from an electroluminescent material, which emits light by means of the excitation of electrical fields, respectively electrical processes. For example, the light element can be configured as a lightning foil.

It is furthermore proposed that the control unit, in conjunction with the light signal unit, is provided for the purpose of indicating a movement of a located object relative to the basic body during the movement of the basic body. An operator can thereby quickly and precisely bring the locating device into a desired position relative to the located object. If the locating device is equipped with an operating mode, wherein the operator can define a reference point of the item being investigated, such as, for example, a desired borehole location, it is conceivable that a movement of the reference point relative to the basic body is indicated when the basic body is moved.

A simple and intuitive display of the item of information can be achieved if the basic body has a guide means for guiding along the item being investigated in a direction of movement and the light signal unit comprises light elements, which form an array oriented in the direction of movement. The guide means is preferably configured as a rolling body, which is mounted on the basic body. The guide means can alternatively or additionally be configured as a sliding surface of the basic body, which allows it to slide on the item being investigated.

It is proposed in this connection that the array has two precision regions, which in each case are constituted by a set of light elements and have in each case a different distance between two adjacent light elements. A precise outputting of the item of information can thereby be achieved in at least a preferred range of the basic body. A fine adjusting of the basic body to achieve a preferred position of the basic body on the item being investigated can be implemented by means of a fine precision region.

In a further configuration of the invention, it is proposed that the light signal unit has a light element and that the control unit, in conjunction with the light element, is provided for the purpose of marking an edge of the basic body. An operator can thereby in a simple and intuitive manner be informed about a position of the edge relative to a reference position, as, for example, the position of a located object or a reference point defined by the operator. In addition said operator can be invited to place a mark on the edge.

Moreover, it is proposed that provision is made for the control unit to output the light signal in conjunction with the light signal using at least two positive light intensities, whereby an advantageous flexibility can be achieved in the outputting of information. The light signal for a light element can be emitted with a temporally variable light intensity, or the light signal can be emitted with at least two light elements, which in each case are simultaneously operated with a different light intensity. By a "positive" light intensity, a light intensity should be particularly understood, which is different than zero.

Flexibility in the outputting of information can further be increased if provision is made for the control unit, in conjunction with the light signal unit, to output the light signal using at least one blinker frequency.

In an advantageous embodiment of the invention, it is proposed that the locating device has an operator interface, which, when interacting with the light signal unit, is provided for the purpose of in- and outputting an item of operating information. In so doing, a compact type of construction can be achieved because additional display elements can be omitted from the operator interface. The operator interface is configured, for example, as a menu-driven operator interface, which is indicated on a display.

It is further proposed, that the control unit, in conjunction with the light signal unit, is provided for the purpose of outputting an item of information about the type of located object. A quick and reliable identification of a located object, especially when the readability of the output unit is impeded, can thereby be achieved. In so doing, different types of objects can be assigned to different light characteristics, such as color, blinker frequency, illumination intensity etc.

It is proposed in a further embodiment of the invention, that the output unit has an acoustic unit for outputting an acoustic signal, and the control unit is provided for the purpose of assigning the acoustic signal to the light signal, whereby an especially effective and reliable transfer of the item of information can be achieved, especially under unfavorable operating conditions. When the basic body is moved, an audio output can signal to the operator that a desired position of the basic body has been achieved.

BRIEF DESCRIPTION OF THE DRAWINGS

Additional advantages become apparent in the following description of the drawing. Examples of embodiment are depicted in the drawing. The drawing, the description and the claims contain numerous characteristics in combination. The expert will also advantageously consider the characteristics individually and put them together in further meaningful combinations.

The following are shown:

FIGS. 4a-4j show different configurations of light elements of the locating device.

DETAILED DESCRIPTION

Figure 1:
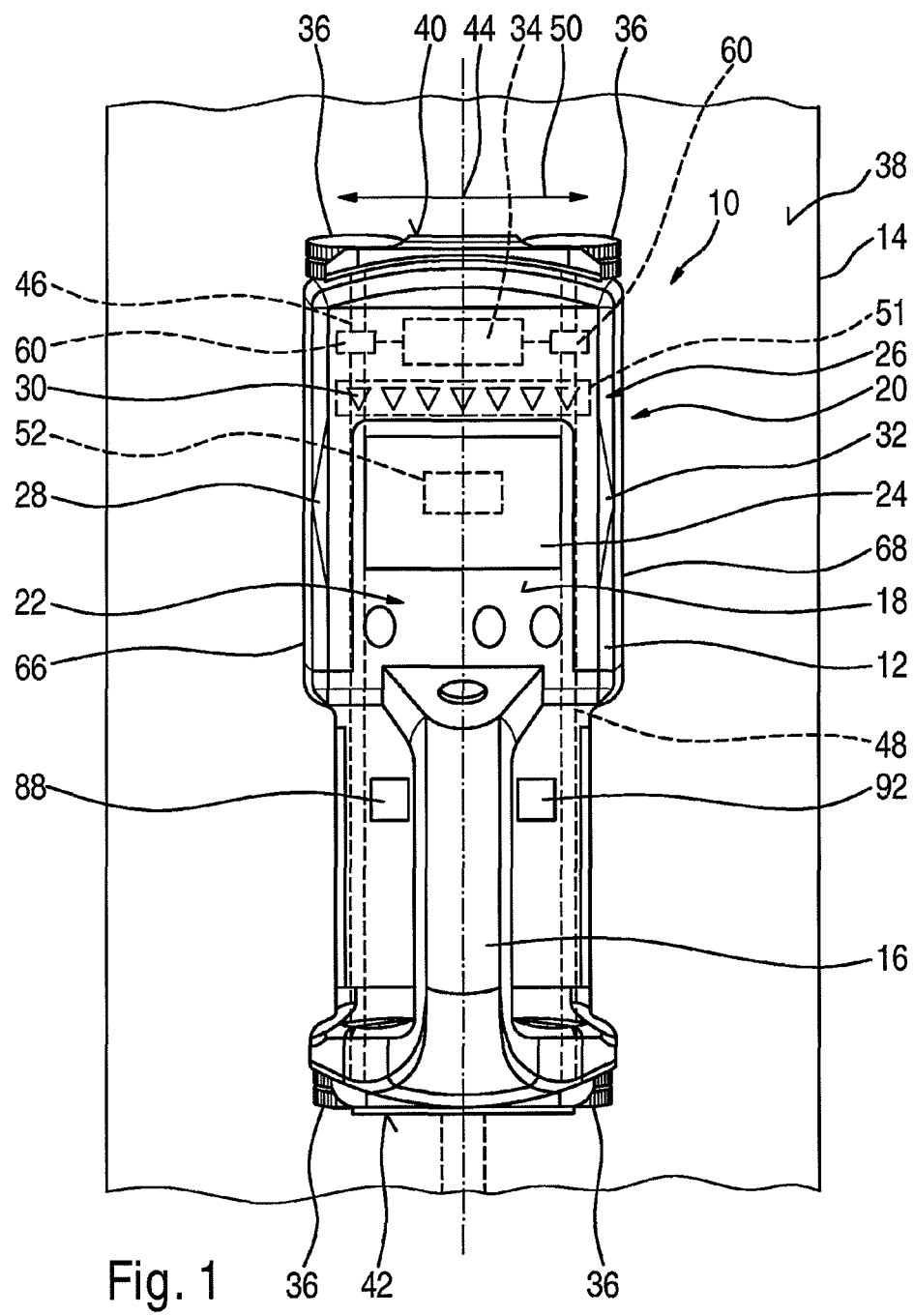
FIG. 1 is a locating device positioned on a wall with a display and an array of light elements.

FIG. 1 shows a locating device 10 with a basic body 12 configured as a housing. It is positioned on an item being investigated 14, which is configured as a wall. A handle 16, by which the locating device 10 can be held by an operator, is mounted on the basic body 12. An output unit 20 for outputting an item of information to an operator and an input unit 22 for inputting an item of information by an operator are attached to the operator side 18 of the basic body 12. Said output unit 20 and said input unit 22 have a set of operating buttons. The output unit 20 has a LC-Display 24 (Liquid Crystal Display) and a light signal unit 26. This comprises a set of light elements 28, 30, 32, which in each case have a light source, which is configured as an LED (light emitting diode). The output unit 20 is controlled during operation by a control unit 34. A configuration of the locating device 10 is conceivable, wherein the LC-Display 24 is omitted.

Furthermore, there are four guide means 36, which are configured as wheels, mounted on the basic body 12, which in the position shown rest against a surface 38 of the item being investigated 14. Two of the guide means 28 are disposed in each case in the region of a lateral surface 40, respectively 42, of the basic body 12. Said lateral surface 40, respectively 42, is vertically oriented to the direction of main extension of the basic body 12, which is denoted by a central axis 44. The guide means 36 are connected in pairs by an axis 46, respectively 48. The axes 46, 48 extend on both sides of the LC-Display 24 in the direction of main extension of the basic body 12. The guide means 36 serve the purpose of guiding the basic body 12 in a direction of movement 50, which is parallel to the surface 38 of the item being investigated 14. The direction of movement 50 is vertically oriented to the direction of main extension of the basic body 12. The light elements form an array 51, which is oriented to the direction of movement 50.

The item being investigated 14 can be scanned by a movement of the basic body 12, which is actuated by the operator, to locate objects, which are invisibly disposed beneath the surface 38. For this purpose, the locating device 10 has a locating unit 52, which is disposed beneath the LC-Display 24. Said locating unit 52 comprises a transmitting unit for the transmission of a measuring signal 54 (see FIG. 2)—which, for example, is configured as a radar signal or a UWB signal (Ultra-wideband signal)—a receiving unit for receiving the measuring signal 54 after its interaction with the item being investigated 14 and an evaluation unit for evaluating the measuring signal 54 (not shown in the Figures).

Figure 2:
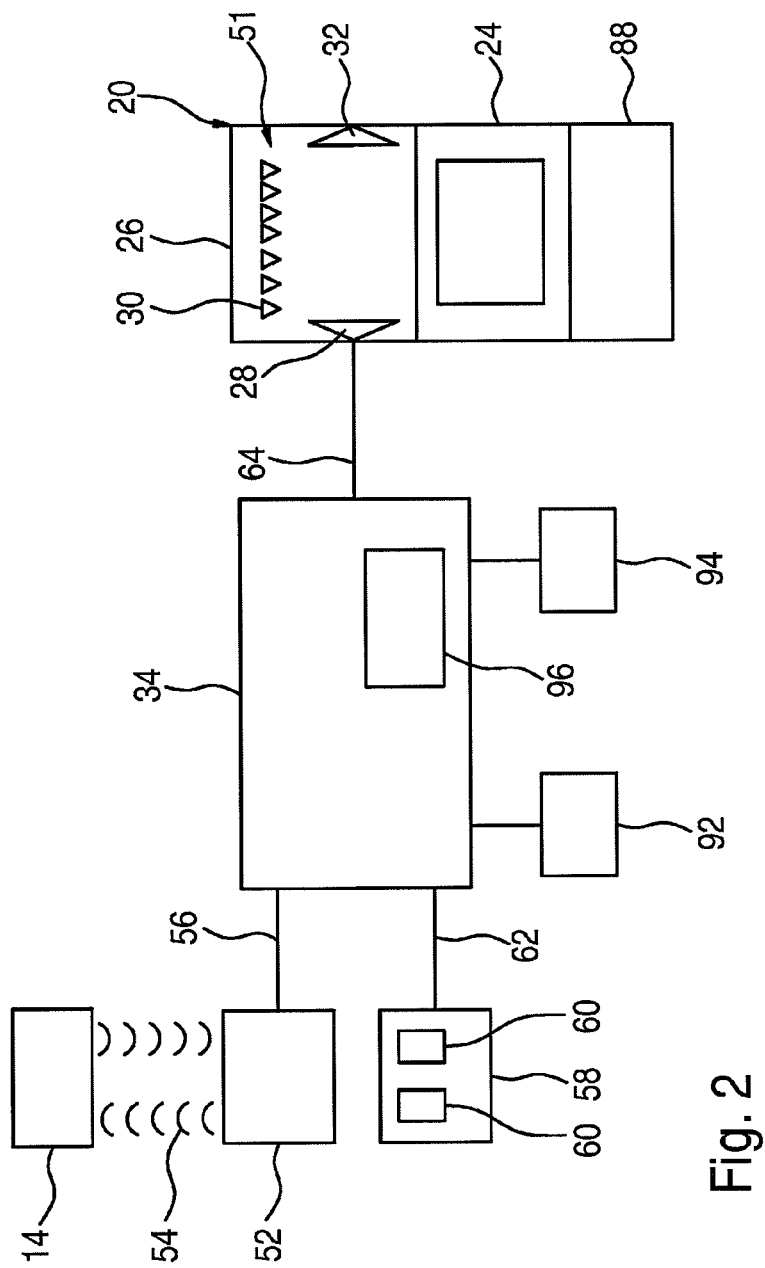
FIG. 2 is a circuit of the internal components of the locating device in a schematic depiction.

An interaction of the control unit 34 with the locating unit 52 and the output unit 20 is described in detail with the aid of FIG. 2. The evaluation of the measuring signal 54, which has been received, delivers an item of information relating to a location 56, which can be outputted with the aid of the output unit 20. This item of information relating to a location 56 is preferably an item of information about a detected object, such as the type of object (for example an electrical cable, a water pipeline etc.), a depression in the item being investigated 14, a position of the object relative to the basic body 12 in the direction of movement 50 etc. Particularly a position of the object relative to the basic body 12 can be especially simply and intuitively indicated by means of the light signal unit 26. If an object is detected in the item being investigated 12 and the position of this object is concealed by the basic body 12, one of the light elements 28, 30, 32 illuminates, whose position corresponds to the position of the object relative to the basic body 12. In the case of unfavorable light conditions or if the locating device 10 is situated in a position, which impedes a reading of the LC-Display 24, the operator can be informed about the presence of the object by the light emitted by the light element 28, 30 or 32.

The locating device 10 can additionally output an item of information about a movement of the basic body 12 relative to the item being investigated 14, which is actuated by the operator. For this purpose, the locating device 10 has a sensor unit 58, which comprises two sensor means 60 configured as path sensors. The sensor means 60 are in each case coupled to one of the axes 46, 48 (see FIG. 1).

In a variation of the embodiment, it is conceivable that the sensor unit 58 comprises only one sensor means 60. This sensor means 60 is preferably coupled to one of the axes 46, 48. At the same time the axes 46, 48 can be mechanically coupled to each other.

The sensor means 60 have in each case a segmented wheel, which is attached to a partial region of the axes 46, 48, at least one transmitting unit for producing a light beam and a receiving unit for receiving the light beam (not shown in the figure). With the aid of the principle of a light barrier, the sensor means 60 detect a minimum programmable movement during the movement of the basic body 12 on the basis of one rotation of the segmented wheel driven by said movement of the basic body 12. This principle is known and is not explained in detail within the scope of this description. The sensor means 60 respectively output a movement parameter 62 configured as an electrical signal, as, for example, as an electrical voltage. Using this movement parameter 62, an item of information about a movement of the basic body 12 can be acquired, such as particularly a distance of the basic body 12 covered and/or a direction of the movement. This item of information can be outputted to the operator by the output unit 20. It is assumed that an object is detected in the item being investigated 14, the position of the object relative to the basic body 12 being signaled by the illumination of a light element 28, 30 or 32. If the operator moves the basic body 12 in the direction of movement 50, a control signal 64 is produced by the control unit 34 on the basis of the movement parameter 62. Said control signal 64 controls the switching-on of an additional light element 28, 30 or 32 of the light signal unit 26. A switching between two light elements 28, 30 or 32 can, for example, be actuated after a certain number of minimum programmable movements, which are detected by the sensor means 60, is achieved. A movement of the position of the object relative to the basic body 12 can be particularly intuitively followed by the operator by way of a light signal, and in fact in this instance by way of the successive illumination of adjacent light elements 28, 30 or 32. This light signal is correlated with the movement parameter 62 detected by the sensor unit 58 and is actuated by the control unit 34 irrespective of the measuring signal 54 of the locating device 52.

One of the light elements 30 is disposed within the array 51 on the central axis 44 of the basic body 12. An operator can thereby move the basic body 12 and at the same time follow the position of the object by way of the light signal unit 26 until the object is positioned under the middle of the basic body 12. In FIG. 1, two edges of the basic body 12, which extend in the direction of main extension of the basic body 12 and face the surface 38 of the item being investigated 14, are designated by the reference numerals 66 and 68. If the detected object is located in the region of the edge 66, respectively 68, this position of the object can be signaled by way of an illumination of the light elements 28, respectively 32, which are mounted on both side of the array 51 on the edge of the basic body 12. These light elements 28, 32 have in each case the form of an arrow, whose point, seen from the vantage point of the basic body 12, is oriented outwards. The edge 66, respectively 68, can be designated by the illumination of the light element 28, respectively 32, whereby the operator can thereby be invited to mark the position of the object on the surface 38.

Figure 3A:
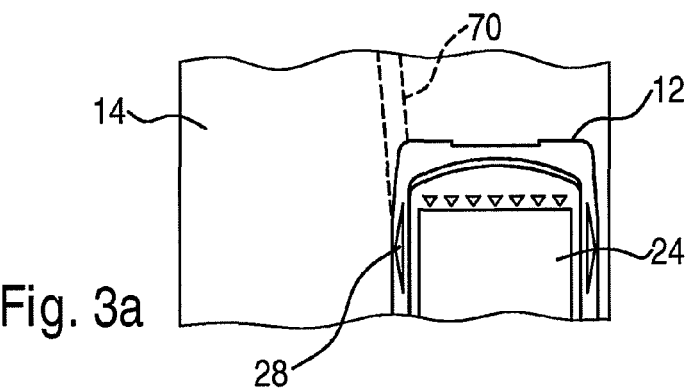
FIGS. 3a-3d show the locating device in four different positions relative to an object in the item being investigated.
Figure 3B:
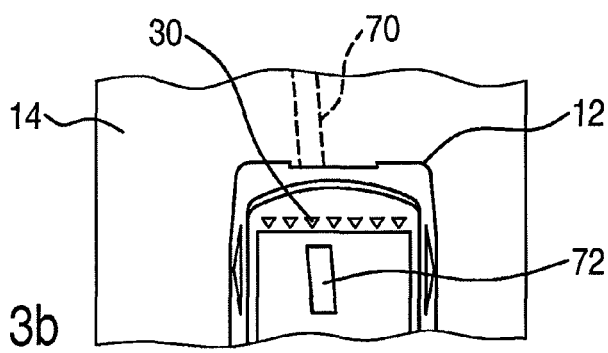
Figure 3C:
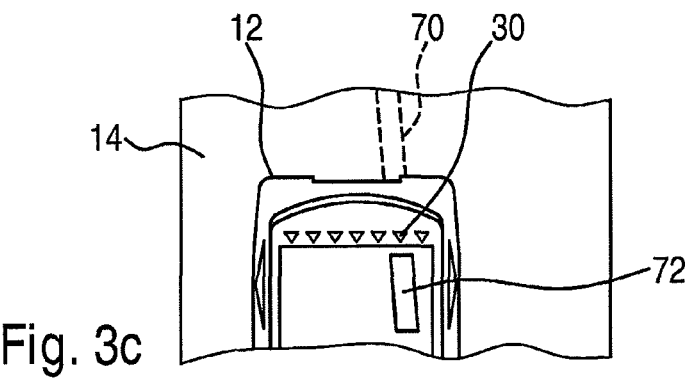
Figure 3D:
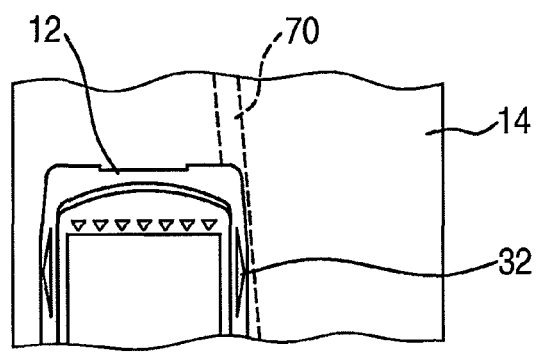

In FIG. 3a, the locating device 10 is depicted in one of the positions previously mentioned, whereat an object 70 (in the figure depicted by a dashed line) is located under the edge 66 of the basic body 12. The light element 28 thereby illuminates. In FIGS. 3a to 3d, the illumination of one of the light elements 28, 30 or 32 is indicated by a denotation with the corresponding reference numeral. Based on the position of the basic body 12 shown in FIG. 3a, said basic body 12 is moved by an operator until the object 70 is located in the region of the edge 68, which is shown in FIG. 3d. As can be understood from the FIGS. 3b and 3c, the light elements 30 of the array 51 successively illuminate during the movement. Additionally in the positions shown in FIGS. 3b and 3c, the presence of the object 70 is indicated by the displaying of a symbol 72 with the aid of the LC-Display 24.

Figure 4F:
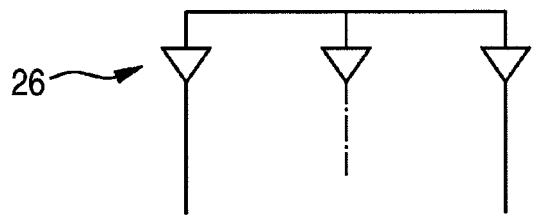

In FIGS. 4a to 4h, different embodiments of the array 51 of the light signal unit 26 are depicted. In FIG. 4a, the array 51 is divided into two sets. A first set on the left side of the central axis 44 has light elements, which are configured in the form of arrows, whose points are oriented in a direction 74 vertical to the central axis 44; while a second set on the right side of the central axis 44 comprises arrows with points in a direction opposite to the direction 74. Light elements of both of the sets lie next to each other on the central axis 44.

FIG. 4b shows a variation of embodiment of the array 51 from FIG. 4a. This has two precision regions 76, 78. The first precision region 76 is formed by a set of light elements 80 in the region of the central axis 44, two adjacent light elements 80 being separated from each other by a distance 84. A set of light elements 82 constitutes the second precision region 78, two light elements 82 being separated from each other by a distance 86. A position of a detected object in the region of the central axis 44 can be signaled with increased accuracy by the distance 84, which is smaller than the distance 86. A central position of the object relative to the basic body 12 can thus be achieved by a fine adjustment of the basic body 12.

Figure 4G:
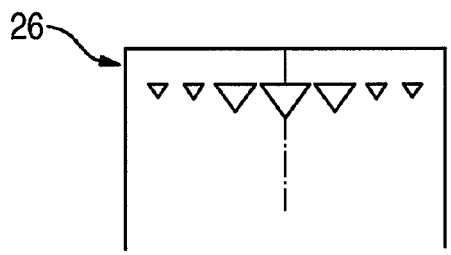
Figure 4H:
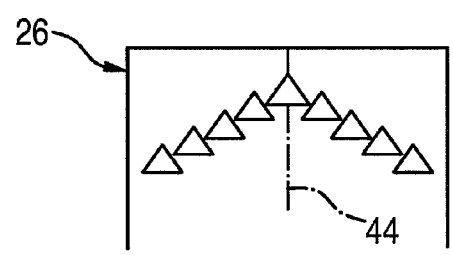
Figure 4I:
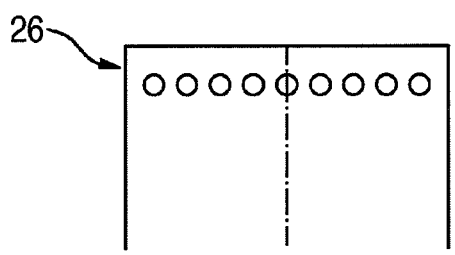
Figure 4J:
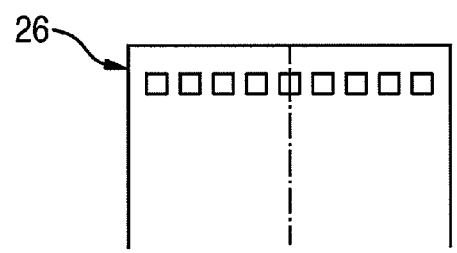

As an alternative to the arrow shaped light elements, arched, beam-like, circular or square light elements can be used, which are depicted in the in FIGS. 4c, 4d, 4i, respectively 4j. Additional geometric configurations of the light elements are conceivable. Moreover, a configuration of the light signal unit 26 with a single light element is conceivable, which is preferably disposed on the central axis 44 of the basic body 12, as can be understood from FIG. 4e. In addition to this central light element, further light elements can be disposed in the region of the edges of the basic body 12, as can be seen in FIG. 4f. Said light elements can signal a position of an object in the region of the edges 66, 68. The light elements can have different sizes, as is depicted in FIG. 4g. The light elements can furthermore constitute a motif by way of their arrangement. The light elements in FIG. 4h are, for example, arranged in such a way that they constitute an arrow, which points in the direction of main extension of the basic body 12, and whose point lies on the central axis 44. An arched shape is also alternatively conceivable.

The flexibility in the outputting of a light signal can be increased in all of the embodiments of the light signal unit 26, which have been depicted, if provision is made for the light elements, for example the light elements 28, 30, 32 from FIG. 1, to produce light with different colors. In so doing, the array 51 can have a plurality of light elements 30, which are provided for the purpose of illumination with a different color in each case; and/or a light element 30, for which provision is made to illuminate with different colors, can be used in the array 51. In an operating mode of the locating device 10, the type of object, which has been located, is designated by a certain color being displayed.

The flexibility can be further increased if a light signal is outputted with the aid of a plurality of light intensities. In an additional operating mode of the locating device 10, the light intensity of a light produced by one of the light elements 28, 30 or 32 is controlled as a function of the item of information relating to a location 56, which is outputted by the location unit 52. The light intensity of a light element can, for example, be proportional to the signal intensity of the measuring signal 54 received by the locating unit 52.

In an additional operating mode of the locating device 10, a blinker frequency of one of the light elements 28, 30, or 32 is controlled by the control unit 34 on the basis of the item of information relating to a location 56 of the locating unit 52. If, for example, an electrical cable is detected by the locating unit 52, the control unit 34 can actuate a blinking of a light element 28, 30, 32, which signals the position of the cable, whereby the operator can be advised of a potential danger of electrical shock. Additional items of location information can be transmitted by different blinker frequencies, such as, for example, the size of the object, the material of the object etc.

Provision is made in a further operating mode of the locating device 10 for a light signal to be outputted with the aid of a plurality of light elements 30, which simultaneously illuminate. An item of information about an extension in the direction of movement 50 of a detected object can thereby be conveyed in this mode. In this way, simply an item of information about the width of the detected object can be indicated to the operator. A certain number of light elements 30 illuminate as a function of the width of the object. In so doing, adjacent light elements 30 with different light intensities can illuminate, the light element, which corresponds to the position of the object's center, illuminating with the greatest light intensity. Moreover, the presence of a plurality of objects, whose position is concealed by the basic body 12, can be signaled by a concurrent illumination of a plurality of light elements 28, 30 or 32.

Provision is furthermore made for an acoustic operating mode of the locating device 10. For this purpose, the output unit 20 has an acoustic unit 88, which is configured as a loud speaker (see FIGS. 1 and 2). In this mode, the control unit 34 correlates an audio output by the acoustic unit 88 with the output of a certain light signal by the light signal unit 26. The presence of an electrical cable can, for example, be conveyed by an acoustic signal; or an acoustic signal can be produced if the basic body 12 achieves a desired position relative to a detected object. The latter would be the case, for example, if a light element 30 illuminates on the central axis 44 of the basic body 12 or the light element 28, respectively 32, illuminates on the edge 66, respectively 68.

Figure 5:
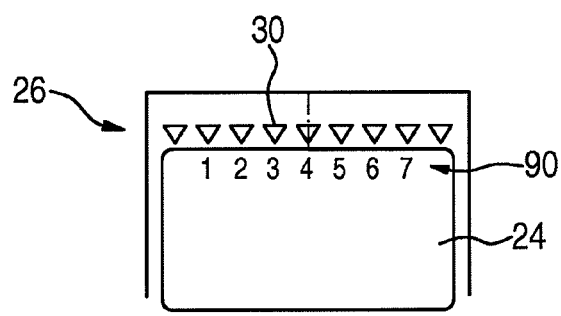
FIG. 5 shows the light elements and the display with an indicated operator surface.

The light signal unit 26 can additionally be used in combination with the LC-Display 24. This is shown in FIG. 5. An operator interface 90 in the form of a menu is indicated on the LC-Display during the preliminary stages of a measurement. Said menu invites the operator to select a certain operating mode or an option with the aid of the input unit 22. The illumination of one of the light elements 30 can indicate which of the operating modes, which are displayed by means of the operator interface 90, is selected.

The operating modes described here and the operator interface 90 as well as additional programs for configuring the locating device 10 and for the interaction of the control unit 34 with the units connected to it, such as, for example, programs for adapting the movement parameter 62 and the item of information relating to a location 56, are stored in a memory unit 96 of the control unit 34.

The locating device 10 additionally has an interface 92 for creating a data connection with an external data unit, such as, for example a PDA, a Laptop, a cellular telephone etc. Provision is made for the interface 92 is in this example to be a wireless data transfer and is configured as a Bluetooth interface. In a further variation of embodiment, the interface 92 can, for example, be implemented as an infrared interface. Provision can alternatively or additionally be made for the interface 92 to be a data transfer by means of a cable connection. The interface 92 can, for example, be configured as a USB interface. The item of information relating to a location 56 and/or an item of information, which has been ascertained on the basis of the movement parameter 62, can, just like a distance covered by the basic body 12, be transferred to the external data unit by means of the interface 92. Alternatively or additionally to this data transfer, these items of information can be stored in an internal memory unit 94 of the locating device 10.

The invention claimed is:

1. A locating device for locating objects in an item being investigated, comprising:
   a body, comprising:
      a sensor unit for detecting a movement parameter when the body is moved with respect to the item being investigated;
      a control unit configured to, in conjunction with an output unit, output at least one item of information on a basis of the movement parameter; and
      a guide means for guiding the body along the item being investigated in a direction of movement;
      wherein the output unit comprises a light signal unit configured to output the at least one item of information using a light signal.

2. The locating device of claim 1, wherein the control unit is further configured to, in conjunction with the light signal unit, indicate a movement of a located object with respect to the body when the body is moved.

3. The locating device according to claim 1, wherein the light signal unit comprises a plurality of light elements that constitute an array oriented in the direction of movement; and wherein the guide means includes a plurality of wheels.

4. The locating device of claim 3, wherein the array has a first precision region and a second precision region, wherein the first precision region includes a plurality of adjacent light elements separated by a first distance, and wherein the second precision region includes a plurality of adjacent light elements separated by a second distance, wherein the first distance is different than the second distance.

5. The locating device of claim 1, wherein the light signal unit comprises of a plurality of light elements; and wherein the control unit is configured to, in conjunction with the plurality of light elements, mark a first edge and a second edge of the object.

6. The locating device of claim 1, wherein the light signal unit is further configured to output the at least one item of information using at least two positive light intensities.

7. The locating device of claim 1, wherein the light signal unit is further configured to output the at least one item of information using a light signal using at least one blinker frequency.

8. The locating device of claim 1, further comprising an operator interface configured to, upon interacting with the light signal unit, receive and transmit an item of operating information.

9. The locating device of claim 1, wherein the control unit is further configured to, in conjunction with the light signal unit, output an item of information relating to a location about a type of the located object.

10. The locating device of claim 1, wherein the output unit further comprises an acoustic unit for outputting an acoustic signal; and wherein the control unit is configured to assign the acoustic signal to a light signal.

11. A locating device for locating an object in an item being investigated, comprising:
   a body, comprising:
      a sensor unit for detecting a movement parameter when the body is moved with respect to the item being investigated;
      a control unit configured to, in conjunction with an output unit, output at least one item of information on a basis of the movement parameter; and
      a display unit including a display, the display unit adapted to superimpose a image of the object on the display when the display is positioned over the object, the display unit further adapted to position the image of the object over the object as the body is moved with respect to the item being investigated.

12. The locating device of claim 11, wherein the output unit comprises a light signal unit configured to output the at least one item of information using a light signal and wherein the control unit is further configured to, in conjunction with the light signal unit, indicate a movement of a located object with respect to the body when the body is moved.

13. The locating device according to claim 11, wherein the body further comprises a guide means for guiding the body along the item being investigated in a direction of movement; and wherein the light signal unit comprises a plurality of light elements that constitute an array oriented in the direction of movement.

14. The locating device of claim 13, wherein the array has a first precision region and a second precision region, wherein the first precision region includes a plurality of adjacent light elements separated by a first distance, and wherein the second precision region includes a plurality of adjacent light elements separated by a second distance, wherein the first distance is different than the second distance.

15. The locating device of claim 11, wherein the output unit comprises a light signal unit configured to output the at least one item of information using a light signal; wherein the light signal unit comprises of a plurality of light elements; and wherein the control unit is configured to, in conjunction with the plurality of light elements, mark a first edge and a second edge of the object.

16. The locating device of claim 11, wherein the output unit comprises a light signal unit configured to output the at least one item of information using a light signal and wherein the light signal unit is further configured to output the at least one item of information using at least two positive light intensities.

17. The locating device of claim 11, wherein the output unit comprises a light signal unit configured to output the at least one item of information using a light signal and wherein the light signal unit is further configured to output the at least one item of information using the light signal using at least one blinker frequency.

18. The locating device of claim 11, further comprising an operator interface, wherein the output unit comprises a light signal unit configured to output the at least one item of information using a light signal, and wherein the operator interface is configured to, upon interacting with the light signal unit, receive and transmit an item of operating information.

19. The locating device of claim 11, wherein the output unit comprises a light signal unit configured to output the at least one item of information using a light signal and wherein the control unit is further configured to, in conjunction with the light signal unit, output an item of information relating to a location about a type of the located object.

20. The locating device of claim 11, wherein the output unit further comprises an acoustic unit for outputting an acoustic signal; and wherein the control unit is configured to assign the acoustic signal to a light signal.

\* \* \* \* \*